United States Patent [19]

Iriyama et al.

[11] Patent Number: 5,641,942
[45] Date of Patent: Jun. 24, 1997

[54] WATERPROOF CONSTRUCTION OF WIRING HARNESS

[75] Inventors: Minoru Iriyama; Takao Kawamura; Takuya Inoue, all of Yokkaichi, Japan

[73] Assignee: Sumitomo Wiring Systems, Ltd., Yokkaichi, Japan

[21] Appl. No.: 293,913

[22] Filed: Aug. 22, 1994

[30] Foreign Application Priority Data

Oct. 4, 1993 [JP] Japan .................. 5-248210

[51] Int. Cl.$^6$ ............................... H02G 3/00
[52] U.S. Cl. .......................... 174/72 A; 174/23 R
[58] Field of Search ............. 174/72 A, 120 R, 174/121 A, 120 SR, 120 FP, 20, 22 R, 23 R; 29/25.01, 25.02

[56] References Cited

U.S. PATENT DOCUMENTS

| Re. 34,732 | 9/1994 | Iri et al. | 385/109 |
| 3,558,801 | 1/1971 | Vinnhorst | 174/102 |
| 3,789,099 | 1/1974 | Garrett et al. | 264/174 |

FOREIGN PATENT DOCUMENTS

| 63-2327 | 1/1988 | Japan . |
| 5193424 | 8/1993 | Japan . |

*Primary Examiner*—Hyung S. Sough
*Attorney, Agent, or Firm*—Greenblum & Bernstein P.L.C.

[57] ABSTRACT

A waterproof construction of a wiring harness passes through a position in a motor vehicle which is a location for readily collecting water in the motor vehicle and includes a branch portion at this position so as to extend upwardly through a predetermined height from the branch portion. The waterproof construction includes a tape which is roughly wound around a bundle of wires up to a first predetermined height for a lowermost position. A waterproof tape is wound around the bundle of wires by half-wrap up to a second predetermined height from a predetermined position on the tape. A resinous sheet is wound around the bundle of the wires from an upper end of the waterproof tape in a direction away from the tape, and a further waterproof tape is wound around the resinous sheet.

16 Claims, 4 Drawing Sheets

WATERPROOF CONSTRUCTION OF WIRING HARNESS

BACKGROUND OF THE INVENTION

The present invention relates to a waterproof construction of a wiring harness provided at a location in a motor vehicle, where water is likely to be splashed.

As shown in FIG. 1, a wiring harness W/H including a main line W/H-1 and a branch line W/H-2 branching off from the main line W/H-1 is provided between a cabin X and an engine portion Y of a motor vehicle and is mounted on a through-hole of a partition wall 1 between the cabin X and the engine portion Y. The main line W/H-1 extends from a space S1 above each of opposite wheel wells 3 to a space S2 above a radiator support 4 located forwards of the tire houses 3, while the branch line W/H-2 is passed through a through-hole formed on an outer wall 5 of an engine room R so as to extend into the engine room R such that the branch line W/H-2 is connected to a branch joint box (not shown), etc. provided in the engine compartment R.

In the engine portion Y outside the cabin X, water is likely to penetrate into, especially, the space S1 above each of the wheel wells 3 and the space S2 above the radiator support 4. Furthermore, since an upper face of each of the wheels wells 3 and the radiator support 4 functions as a water receiving plate, water which has penetrated into the space S1 or S2 is readily collected on the upper face of each of the wheel wells 3 and the radiator support 4. Therefore, water stored on the upper face of each of the wheel wells 3 and the radiator support 4 is apt to penetrate into the wiring harness W/H provided along the upper face of each of the wheel wells 3 and the radiator support 4.

Meanwhile, water is also likely to penetrate into a distal end portion of the wiring harness W/H, which is coupled with a connector.

Once water has been penetrated into the wiring harness W/H, water enters the cabin X through gaps among wires W in the wiring harness W/H, so that a connector coupled with a distal end of the wiring harness W/H in the cabin X is rusted, thereby resulting in improper connection or short-circuiting at the connector.

In order to prevent penetration of water into the cabin X through the wiring harness W/H provided at the location where water is likely to be splashed, such a measure is taken that a waterproof tape is wound around the wiring harness W/H by double half-wrap and then, the wiring harness is inserted into a protective sheathing formed by a corrugated tube.

However, even if the waterproof tape is wound around the wiring harness W/H by double half-wrap, it is impossible to completely eliminate a possibility that a gap is formed between the tapes. Therefore, in order to solve this problem, the assignee assigned by the present inventors proposed in Japanese Patent Laid-Open Publication No. 5-193424 (1993) a watertight construction of the wiring harness W/H as shown in FIGS. 2A and 2B. Namely, in the wiring harness W/H provided in the space S1 above each of the wheel wells 3 as shown in FIG. 2A, a predetermined height H is formed between a first branch point P1 of the wiring harness W/H from the grommet 2 and a highest point P2 of the wiring harness W/H in the engine portion Y. Thus, water which has penetrated into the wiring harness W/H from the main line W/H-1 or a connector disposed at a distal end of the branch line W/H-2 in the engine compartment R is collected to the lowest first branch point P1 so as not to proceed towards the cabin X. Furthermore, as shown in FIG. 2B, instead of winding a waterproof tape around a bundle of the wires W by double half-wrap, a waterproof sheet 6 made of resin is wound around the bundle of the wires W and then, a tape 7 is roughly wound around the waterproof sheet 6 so as to firmly bundle the wires W.

When the watertight construction referred to above is employed, the resinous waterproof sheet 6 covers the outer periphery of the bundle of the wires W completely and thus, it is possible to positively prevent water from penetrating into the wiring harness W/H from the outer periphery. However, at the branch point P1 of the wiring harness W/H, the resinous waterproof sheet 6 cannot be wound around the bundle of the wires W in close contact with the outer periphery of the bundle of the wires W. Thus, as shown in FIG. 2A, an edge 6a of the resinous waterproof sheet 6 should be positioned at the branch point P1.

Thus, the branch point P1 cannot be waterproofed by covering the branch point P1 with the resinous sheet 6. Meanwhile, in case the branch point P1 is disposed at a lowermost position for storing penetrating water as shown in FIG. 2A, a portion of the wiring harness W/H, which is not covered by the resinous waterproof sheet 6, is likely to be immersed in stored water.

Furthermore, the distal end portion of the wiring harness W/H in the engine room R, which is coupled with a connector, also cannot be completely covered by the resinous waterproof sheet 6. As a result, water which has penetrated into the wiring harness W/H from the distal end portion proceeds through gaps among the wires W of the wiring harness W/H and thus, is collected at the branch point P1.

In order to solve this problem, the height H is defined between the branch point P1 which is not covered by the resinous waterproof sheet 6 and the highest point P2 of the wiring harness W/H shifted from the engine room R towards the cabin X as described above. Therefore, even if water has penetrated into the wiring harness W/H at the branch point P1, water is caused by the height H to flow to the branch point P1 so as not to penetrate into the cabin X. However, during running of the motor vehicle, pressure in the engine portion Y becomes higher than that in the cabin X, so that negative pressure in the cabin X produces force for sucking towards the cabin X water which has penetrated into the wiring harness W/H. As running speed of the motor vehicle becomes higher, negative pressure in the cabin X rises and thus, the suction force towards the cabin X is increased.

In addition, in case the resinous waterproof sheet 6 is wound around the bundle of the wires W and then, the tape 7 is wound around the resinous waterproof sheet 6 as shown in FIG. 2B, a gap C1 is formed among neighboring ones of the wires W, a gap C2 is formed between the resinous waterproof sheet 6 and outer peripheral ones of the wires W and a gap C3 is formed between the overlapped resinous waterproof sheet 6. Water which has penetrated into the wiring harness W/H up to the branch point P1 is sucked up by capillarity through the gaps C1, C2 and C3 acting as capillary channels.

By the above mentioned sucking of water based on capillarity and the above described sucking of water based on negative pressure in the cabin X, water penetrates into the cabin X through the wiring harness W/H even if the height H is formed on the wiring harness W/H.

SUMMARY OF THE INVENTION

Accordingly, an essential object of the present invention is to provide, with a view to eliminating the above mentioned drawbacks inherent in conventional wiring harnesses, a waterproof construction of a wiring harness, which is capable of positively preventing penetration of water into a cabin through the wiring harness even if either sucking force of penetrating water is produced by negative pressure in the cabin during running of a motor vehicle or water is sucked through gaps in the wiring harness by capillarity.

In the first place, the present inventors thoroughly investigated by experiments how suction height of water from a portion of the wiring harness immersed in water changes according to changes of negative pressure and changes of arrangements for covering the wiring harness.

[Experiment 1]

As shown in FIG. 3A, a tape 10 is roughly wound around a bundle of wires W and then, a polyethylene sheet 11 is wound around the tape 10 two times. Finally, a waterproof tape 12 is wound around the sheet 11 by half-wrap. A lower end of a wiring harness W/H of this covering arrangement is immersed in water.

In no-load state in which negative pressure is not applied to an upper end of the wiring harness W/H, water can be sucked up to a height of 90 mm through a gap C1 formed among neighboring ones of the wires W and a gap C2 formed between the sheet 11 and the wires W. On the other hand, water can be sucked up to a height of 230 mm through a gap C3 formed between the overlapped portions of the sheet 11. The gaps C1 to C3 correspond to those of a known waterproof construction shown in FIG. 2B.

In a state where negative pressure expected to be produced during running of the motor vehicle is applied to an upper end of the wiring harness W/H, water is sucked up to a height of 120 mm through the gaps C1 and C2, while water is sucked up to a height of 260 mm through the gap C3.

[Experiment 2]

As shown in FIG. 3B, the tape 10 is roughly wound around a bundle of the wires W and then, the waterproof tape 12 is wound around the tape 10 by half-wrap. Namely, in the experiment 2, the sheet 11 of the experiment 1 is eliminated. In the same manner as the experiment 1, a lower end of the wiring harness W/H is immersed in water.

In no-load state, water is sucked up to a height of 90 mm through the gap C1 formed among neighboring ones of the wires W. Since capillary channels enabling capillarity are not defined at portions of the wiring harness W/H, around which the tape 10 and the waterproof tape 12 are wound, sucking of water does not take place at these portions of the wiring harness W/H. Therefore, water is sucked only through the gap C1.

In a state where negative pressure expected to be produced during running of the motor vehicle is applied to an upper end of the wiring harness W/H, water is sucked up to a height of 120 mm through the gap C1.

[Experiment 3]

As shown in FIG. 3C, only the tape 10 is roughly wound around a bundle of the wires W. Namely, in the experiment 3, the sheet 11 and the waterproof tape 12 of the experiment 1 are eliminated.

In the same manner as the experiments 1 and 2, a lower end of the wiring harness W/H is immersed in water.

In no-load state, water is sucked up to a height of 25 mm through the gap C1.

In a state where negative pressure expected to be produced during running of the motor vehicle is applied to an upper end of the wiring harness W/H, negative pressure is not produced at portions of the wiring harness W/H, around which the tape 10 is roughly wound. As a result, water is sucked up to a height identical with that of no-load state.

From the results of the experiments 1 to 3, it is concluded that in penetration of water from the portion of the wiring harness W/H immersed in water, water is sucked in larger amount through the gap C1 formed among the wires W than the gap C3 formed between the overlapped portions of the resinous sheet 11. A minimum amount of water is sucked when only the tape 10 is roughly wound around a bundle of the wires W. It was also found that when the tape 10 is roughly wound around the wiring harness W/H up to a height of at least 25 mm from the portion immersed in water, water is not sucked up to a height exceeding 25 mm from the portion immersed in water.

Then, without immersing the distal end portion of the wiring harness W/H in water, height of sucking of water is measured by sprinkling water over outer periphery of the wiring harness W/H in the following experiments 4 and 5.

[Experiment 4]

As shown in FIG. 4A, the tape 11 is roughly wound around a bundle of the wires W, the polyethylene sheet 11 is wound around the tape 11 two times and then, the waterproof tape 12 is wound around the sheet 11 by half-wrap in the same manner as the experiment 1. From one side of the wiring harness W/H of the above described covering arrangement, water is sprinkled over the wiring harness W/H at a flow rate of 13 l/min. by using a hose 16.

In no-load state where negative pressure is not applied to an upper end of the wiring harness W/H, water is sucked up to 10 mm through the gap C1 formed among the neighboring ones of the wires W and the gap C2 formed between the sheet 11 and the wires W. On the other hand, water is sucked up to a height of 90 mm through the gap C3 formed between the overlapped portions of the sheet 11.

In a state where negative pressure expected to be produced during running of the motor vehicle is applied to an upper end of the wiring harness W/H, water is sucked up to a height of 40 mm through the gaps C1 and C2, while water is sucked up to a height of 125 mm through the gap C3.

[Experiment 5]

As shown in FIG. 4B, the tape 10 is roughly wound around a bundle of the wires W and then, the waterproof tape 12 is wound around the tape 10 by half-wrap. Namely, in the experiment 5, the sheet 11 of the experiment 4 is eliminated. In the same manner as the experiment 4, water is sprinkled over the wiring harness W/H.

In no-load state, water is sucked up to a height of 15 mm through the gap C1 formed among the neighboring ones of the wires W. Since capillary channels enabling capillarity are not defined at portions of the wiring harness W/H, around which the waterproof tape 12 are wound, water is not sucked at these portions of the wiring harness W/H. Accordingly, water is sucked only through the gap C1.

In a state where negative pressure expected to be produced during running of the motor vehicle is applied to an upper end of the wiring harness W/H, water is sucked up to a height of 45 mm through the gap C1.

It was found from the experiments 4 and 5 that sucked water is smaller in amount by half-wrap winding of the waterproof tape than by winding of the resinous sheet and that if height of half-wrap winding of the waterproof tape is 45 mm, height of sucking of water does not exceed 45 mm.

The above experiments 1 to 5 reveal that if rough winding of the wiring harness is performed from the portion immersed in water to a height of 25 mm and then, the waterproof tape is wound around a portion of the wiring harness above the rough winding portion up to a height of 45 mm from the rough winding portion by half-wrap, water penetrating into the wiring harness from the distal end of the rough winding portion and the half-wrap winding portion is not sucked up to a height exceeding 45 mm from the rough winding portion even when being sucked by capillarity. Consequently, it is most preferable that after half-wrap winding referred to above, the wiring harness is covered by the resinous sheet capable of preventing penetration of water from the outer peripheral surface.

The present invention is based on the above mentioned experiments and provides a waterproof construction of a wiring harness which is passed through a lowermost position in a motor vehicle as a location for readily collecting water in the motor vehicle and includes a branch portion at the lowermost position so as to extend upwardly through a predetermined height from the branch portion, the waterproof construction comprising: a tape which is roughly wound around a bundle of wires up to a first predetermined height from the lowermost position; a waterproof tape which is wound around the bundle of the wires by half-wrap up to a second predetermined height from an upper end of the tape; a resinous sheet which is wound around the bundle of the wires from an upper end of the waterproof tape in a direction away from the tape; and a further waterproof tape which is wound around the resinous sheet.

The first predetermined height of the tape is set at not less than a first maximum height of sucking of water from the lowermost position by capillarity for rough winding of the tape and the first maximum height is about 25 mm. Therefore, rough winding of the tape is performed up to at least a height of 25 mm from the lowermost position.

The second predetermined height of the waterproof tape is set at not less than a second maximum height of sucking of water from the upper end of the tape by capillarity for half-wrap winding of the waterproof tape and the second maximum height is about 45 mm. Hence, half-wrap winding of the waterproof tape is performed up to at least a height of 45 mm from the upper end of the tape.

If the tape is wound around the bundle of the wires throughout an overall length of the wiring harness, half-wrap winding of the waterproof tape and winding of the resinous sheet are facilitated, which is preferable.

The above mentioned waterproof construction is suitable for use in a wiring harness which is passed from a cabin to an engine portion through a partition wall so as to be carried through a first space above each of opposite wheel wells and a second space above a radiator support such that the branch portion is inserted into an engine compartment through an outer wall of the engine compartment. Furthermore, the branch portion branches off from a main line of the wiring harness at the lowermost position on the wheel wells and the radiator support such that the tape, the waterproof tape, the resinous sheet and the further waterproof tape are sequentially wound around the bundle of the wires of the main line extending towards the cabin from the lowermost position.

By the waterproof construction of the wiring harness, in case the branch portion of the wiring harness is disposed at the lowermost position for collecting water and a distal end of the resinous sheet should be disposed such that the branch portion is not completely covered by the resinous sheet, height of sucking of water from the lowermost position by capillarity can be minimized because the tape is roughly wound around the bundle of the wires up to the first predetermined height from the lowermost position. Furthermore, since the first predetermined height of the tape is set at not less than the first maximum height of sucking of water from the lowermost position by capillarity for rough winding of the tape, water is not sucked up beyond the rough winding portion of the tape from the lowermost position.

In addition, the waterproof tape is wound around the bundle of the wires by half-wrap up to the second predetermined height from the upper end of the tape and the second predetermined height of the waterproof tape is set at not less than the second maximum height of sucking of water from the upper end of the tape by capillarity for half-wrap winding of the waterproof tape. Therefore, even if water penetrates into the wiring harness from the distal end of the waterproof tape and is sucked up by capillarity, water is not sucked up beyond the half-wrap winding portion of the waterproof tape.

Since the resinous sheet is wound around the bundle of the wires after rough winding of the tape from the lowermost position for collecting water and half-wrap winding of the waterproof tape as described above, namely, at a predetermined height from the lowermost position, where the distal end of the resinous sheet is not substantially positively immersed in water, sucking of much water from the distal end of the resinous sheet by capillarity can be prevented. In addition, at the portion of the wiring harness covered by the resinous sheet, since no gap is produced on the outer peripheral surface in contrast with covering of the waterproof tape, penetration of water into the wiring harness from the outer peripheral surface can be prevented positively.

Thus, while advantages of use of the resinous sheet are gained, disadvantages incurred by use of the resinous sheet are obviated, so that it is possible to completely prevent water penetrating into the wiring harness outside the cabin from proceeding into the cabin.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
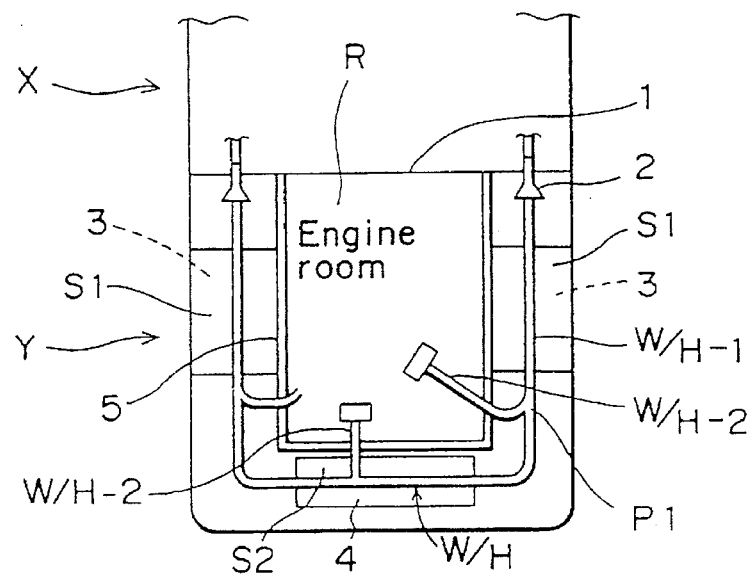
FIG. 1 is a schematic top plan view of a prior art wiring harness to be waterproofed (already referred to)
Figure 2A:
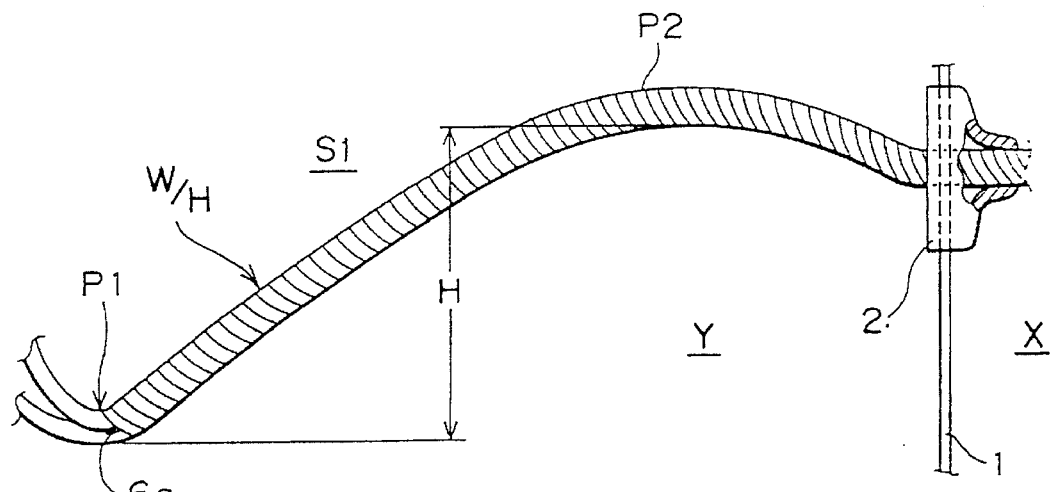
FIG. 2A is a fragmentary front elevational view a prior art waterproof construction of the wiring harness of FIG. 1 (already referred to)
Figure 2B:
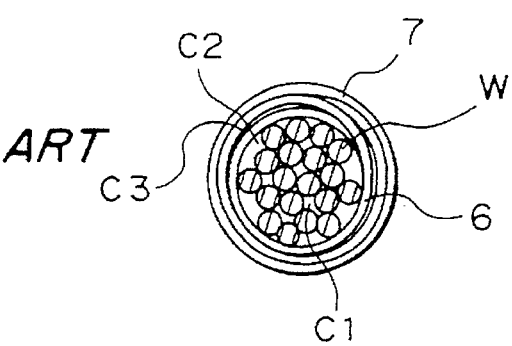
FIG. 2B is a sectional view of the prior art waterproof construction of FIG. 2A (already referred to)
Figures 3A, 3B, 3C:
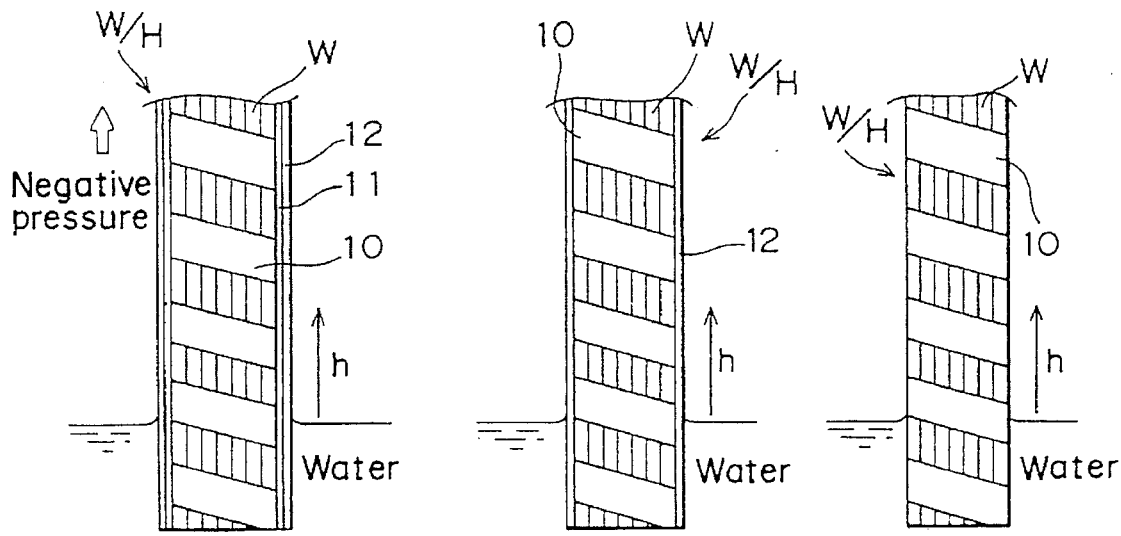
FIGS. 3A, 3B and 3C are views indicative of methods of measuring height of sucking of water in a wiring harness due to capillarity in the case of immersion of distal ends of wires in water by changing covering arrangements of the wires, respectively.
Figures 4A, 4B:
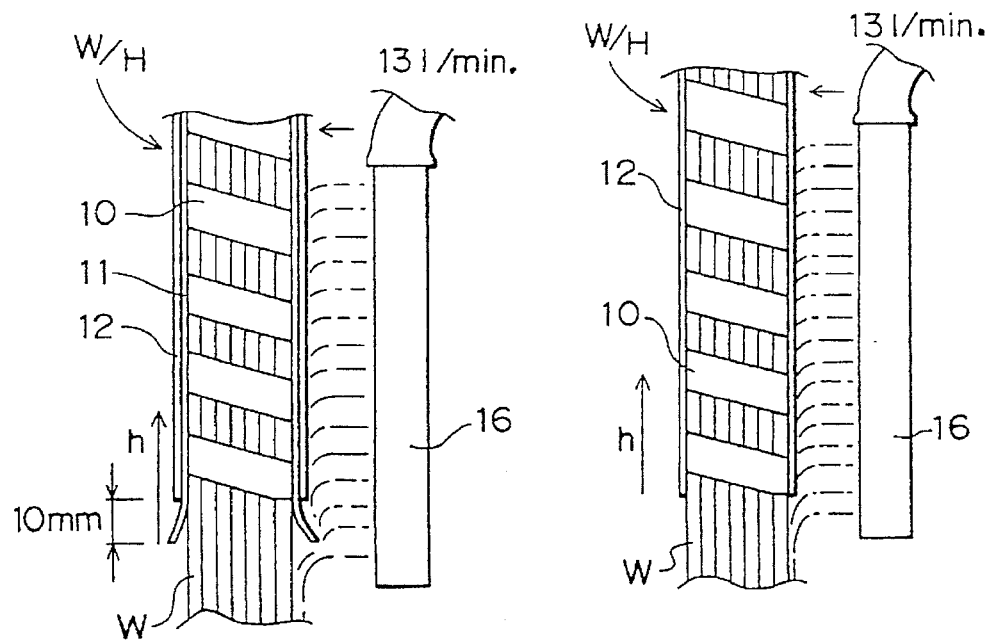
FIGS. 4A and 4B are views indicative of methods of measuring height of sucking of water in a wiring harness due to capillarity in the case of sprinkle of water over the wiring harness by changing covering arrangements of the wires, respectively.
Figure 5:
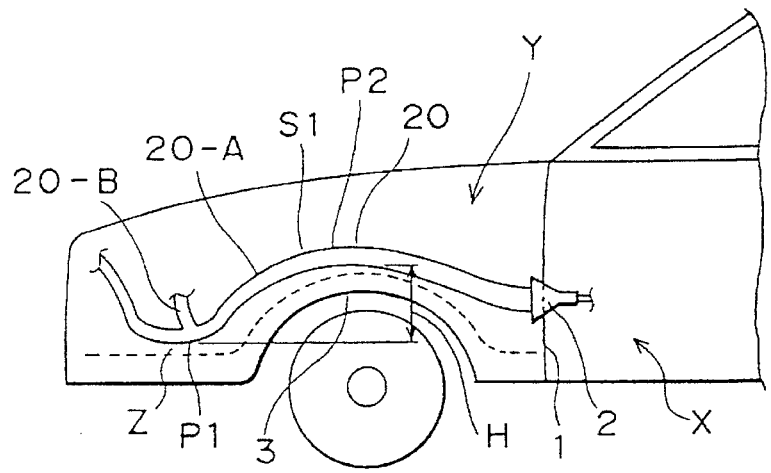
FIG. 5 is a schematic view of a wiring harness according to the present invention, which is provided in a motor vehicle.

Referring now to the drawings, there is shown in FIGS. 5, 6 and 7A–7C, a wiring harness 20 having a waterproof construction according to one embodiment of the present invention. As shown in FIG. 5, the wiring harness 20 is provided in a motor vehicle in the same manner as a prior art wiring harness W/H shown in FIG. 1. Therefore, a main line 20-A of the wiring harness 20 is passed, via a grommet 2, through a partition wall 1 between a cabin X and an engine portion Y and then, is carried through a space S1 above each of opposite wheel wells 3 outside the cabin X so as to be disposed in a space above a radiator support located forwards of the wheel wells 3.

A point P1 at which the a branch line 20-B branches off from the main line 20-A firstly is disposed at a lowermost position Z in the space S1 above the wheel wells 3. Although not specifically shown, another branch line branches off from the main line 20-A also at a lowermost position in the space above the radiator support.

Water is quite likely to penetrate into the space S1 above the wheel wells 3 from a front window. Therefore, at the lowermost position Z in the space S1 above the wheel wells 3, water is apt to be collected on an upper face of the wheel wells 3. As a result, it is quite possible that at the branch point P1 located at the lowermost position Z in the space S1 above the wheel wells 3, the wiring harness 20 is immersed in water.

The wiring harness 20 is inclined upwardly along shape of the wheel wells 3 from the branch point P1 towards the cabin X. An uppermost point P2 of the wiring harness 20 in the engine portion Y has a height H relative to the lowermost branch point P1. In this embodiment, the height H is set at not less than 70 mm.

Figure 6:
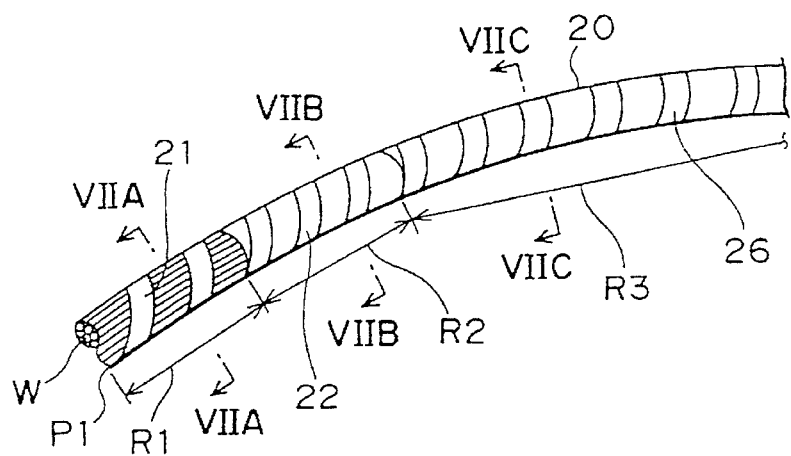
FIG. 6 is an enlarged fragmentary perspective view of the wiring harness of FIG. 5.
Figures 7A, 7B, 7C:
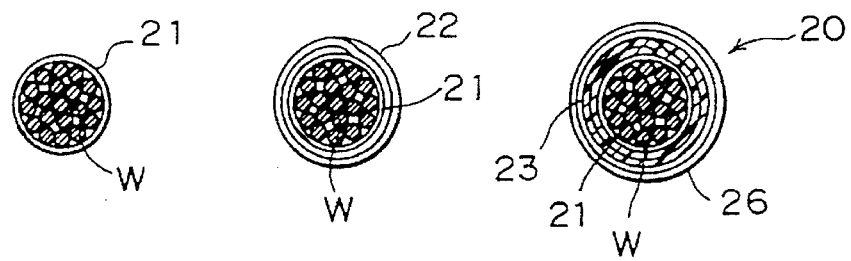
FIGS. 7A, 7B and 7C are sectional views taken along the lines VIIA—VIIA, VIIB—VIIB and VIIC—VIIC in FIG. 6, respectively.

AS shown in FIG. 6, a tape 21 is roughly wound around the wiring harness 20 up to a height of not less than 25 mm (a height of 150 mm in this embodiment) from the lowermost branch point P1 so as to have a rough winding interval R1. Rough winding has a function of merely bundling a number of wires W and means that the tape 21 is wound around an outer periphery of wires W at a large pitch so as to form a large gap between neighboring ones of windings of the tape 21. Rough winding of the tape 21 is initially performed throughout an overall length of the wiring harness 20. Subsequently, a waterproof tape 22 is wound around the roughly wound tape 21 up to a height of not less than 45 mm (a height of 215 mm in this embodiment) from an upper end of the rough winding interval R1 by half-wrap so as to have a half-wrap winding interval R2. Half-wrap winding means that the tape is helically wound by wrapping a half of a width of the tape so as to eliminate a gap between neighboring ones of windings of the tape.

Figure 8:
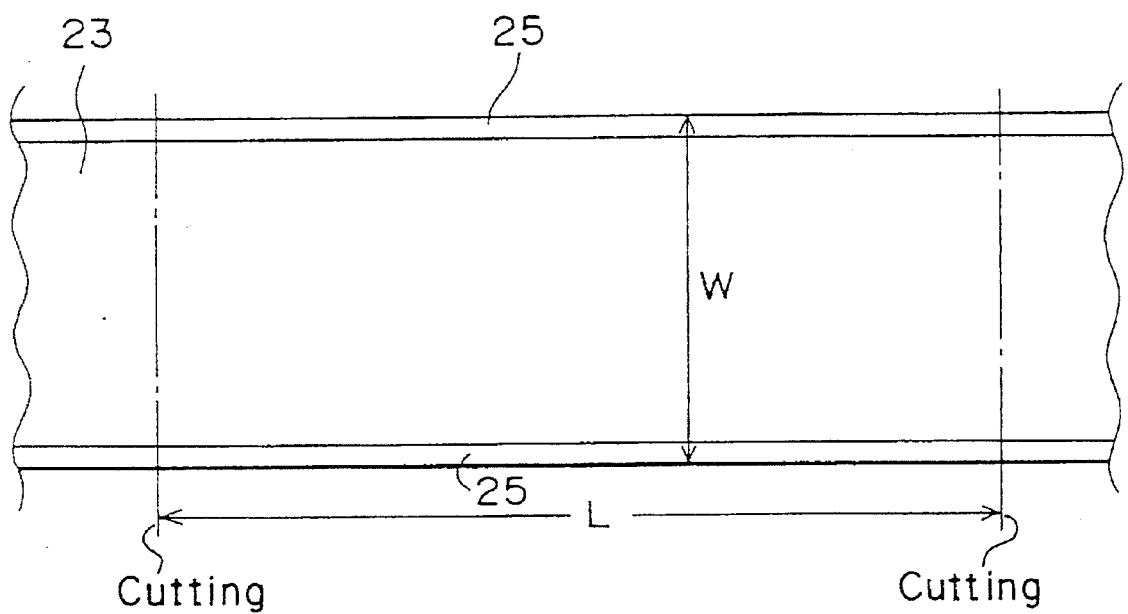
FIG. 8 is a fragmentary top plan view of a resinous sheet employed in the wiring harness of FIG. 5.

Then, a sheet 23 made of resin such as polyethylene is wound around the roughly wound tape 21 through an interval R3 from an upper end of the half-wrap winding interval R2. As shown in FIG. 8, the resinous sheet 23 is formed by a continuous sheet having a constant width W and is cut to an arbitrary length L according to length of the wires W. In this embodiment, the resinous sheet 23 has a width W of 200 mm and a thickness of 0.06 mm, while adhesive 25 is preliminarily applied to opposite sides of the resinous sheet 23. In accordance with diameter of a bundle of the wires W, the resinous sheet 23 is wound around the tape 21 two to three times so as to be secured to the tape 21 by the adhesive 25. After the resinous sheet 23 has been wound around the tape 21, a waterproof tape 26 is wound around the resinous sheet 23. The interval R3 of the resinous sheet 23 is extended up to an end portion of the wiring harness 20, which is mounted on the grommet 2. Meanwhile, the interval R3 of the resinous sheet 23 is not required to be inclined more upwardly than the upper end of the half-wrap winding interval R2 and thus, may be oriented horizontally.

From the lowermost branch point P1, the wiring harness 20 has the rough winding interval R1, the half-wrap winding interval R2 and the interval R3 of the resinous sheet 23 as described above. Even if the wiring harness 20 is immersed in water at the branch point P1, height of sucking of water obtained by capillarity for rough winding is 25 mm even when maximum suction force is produced during running of the motor vehicle. Since the rough winding interval R1 is set at not less than 25 mm in the wiring harness 20 as described above, water is not sucked beyond the rough winding interval R1.

Water penetrates into the rough winding interval R1 of the wiring harness 20 from its outer peripheral surface due to sprinkle of water. Although the half-wrap winding interval R2 extends from the upper end of the rough winding interval R1, such a case may happen in which water penetrates into the wiring harness 20 from an outer peripheral surface of the upper end of the rough winding interval R1, i.e the lower end of the half-wrap winding interval R2. However, since height of the half-wrap winding interval R2 is set at not less than height of sucking of water obtained by capillarity for half-wrap winding, i.e. not less than 45 mm, water is not sucked beyond the half-wrap winding interval R2.

The half-wrap winding interval R2 is followed by the interval R3 of the resinous sheet 23 and the waterproof tape 26 of half-wrap winding. Since penetration of water into the wiring harness 20 from the outer peripheral surface at the interval R3 can be completely prevented by the resinous sheet 23 and the distal end of the resinous sheet 23 is spaced from a location where penetration of water takes place, penetration of water into the wiring harness 20 from the distal end of the resinous sheet 23 can also be prevented.

As is clear from the foregoing description of the waterproof construction of the wiring harness, according to the present invention, since the tape is roughly wound around the bundle of the wires up to the predetermined height from the branch point of the wiring harness, which is disposed at the lowermost position for collection of water, height of sucking of water from the lowermost position by capillarity is minimized and water sucked from the lower end of the rough winding portion is not sucked upwardly beyond the rough winding portion.

Furthermore, the waterproof tape is wound around the roughly wound tape up to the predetermined height by half-wrap subsequently to the rough winding portion. Therefore, even if water penetrating into the wiring harness from the distal end of the waterproof tape is sucked by capillarity, height of the half-wrap winding is set at not more than the maximum height of sucking of water achieved by capillarity and thus, water is not sucked upwardly beyond the half-wrap winding portion.

Since rough winding is performed from the lowermost position for collection of water and then, half-wrap winding of the waterproof tape is performed, namely, the bundle of the wires are covered by the resinous sheet from the position of the wiring harness, where the distal end of the resinous sheet is not positively immersed in water, sucking of much water performed from the distal end of the resinous sheet by capillarity can be prevented. Furthermore, in contrast with covering by the waterproof tape, since no gap is produced on the outer peripheral surface of the portion of the wiring harness, which is covered by the resinous sheet, penetration of water into the wiring harness from said outer peripheral surface can be prevented positively.

Accordingly, while advantages of use of the resinous sheet are gained, disadvantages incurred by use of the resinous sheet are obviated, so that it is possible to completely prevent water penetrating into the wiring harness outside the cabin from proceeding into the cabin.

What is claimed is:

1. A waterproof construction of a wiring harness which is passed through a water collecting position in a motor vehicle as a location for readily collecting water in a motor vehicle and includes a branch portion at the water collecting position so as to extend upwardly through a predetermined height from the branch portion, the waterproof construction comprising:

a tape which is roughly wound around a bundle of wires up to a first predetermined height from the water collecting position;

a waterproof tape which is wound around the bundle of wires by half-wrap up to a second predetermined height from predetermined position on the tape;

a resinous sheet which is wound around the bundle of the wires from an upper end of the waterproof tape in a direction away from the tape; and a further waterproof tape which is wound around the resinous sheet.

2. A waterproof construction as claimed in claim 1, wherein the first predetermined height of the tape is set at not less than a first maximum height of sucking of water from the water collecting position by capillarity for rough winding of the tape and the second predetermined height of the waterproof tape is set at not less than a second maximum height of sucking of water from the predetermined position on the tape by capillarity for half-wrap winding of the waterproof tape.

3. A waterproof construction as claimed in claim 1, wherein the first predetermined height is set at not less than 25 mm and the second predetermined height is set at not less than 45 mm.

4. A waterproof construction as claimed in claim 2, wherein the first maximum height is 25 mm and the second maximum height is 45 mm.

5. A waterproof construction as claimed in claim 1, wherein the tape is roughly wound around the bundle of the wires throughout an overall length of the wiring harness.

6. A waterproof construction as claimed in claim 2, wherein the tape is roughly wound around the bundle of the wires throughout an overall length of the wiring harness.

7. A waterproof construction as claimed in claim 3, wherein the tape is roughly wound around the bundle of the wires throughout an overall length of the wiring harness.

8. A waterproof construction as claimed in claim 4, wherein the tape is roughly wound around the bundle of the wires throughout an overall length of the wiring harness.

9. A waterproof construction as claimed in claim 1, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

10. A waterproof construction as claimed in claim 2, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

11. A waterproof construction as claimed in claim 3, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

12. A waterproof construction as claimed in claim 4, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

13. A waterproof construction as claimed in claim 5, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

14. A waterproof construction as claimed in claim 6, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

15. A waterproof construction as claimed in claim 7, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

16. A waterproof construction as claimed in claim 8, wherein the wiring harness is passed from a cabin to an engine portion through a partition wall so as to be carried through a first space above each of opposite wheel wells and a second space above a radiator support such that the branch portion is inserted into an engine compartment through an outer wall of the engine compartment, wherein the branch portion branches off from a main line of the wiring harness at a lowermost position in the first space and the second space such that the tape, the waterproof tape, the resinous sheet and the further waterproof tape are sequentially wound around the bundle of the wires of the main line extending from the lowermost position towards the cabin.

\* \* \* \* \*